No. 744,785. PATENTED NOV. 24, 1903.
B. McCAUGHEY.
DRIP PAN.
APPLICATION FILED AUG. 5, 1903.
NO MODEL.

Witnesses:
Edward W. Blodgett
Florence E. Palter

Bernard McCaughey,
Inventor:

No. 744,785. Patented November 24, 1903.

UNITED STATES PATENT OFFICE.

BERNARD McCAUGHEY, OF PAWTUCKET, RHODE ISLAND.

DRIP-PAN.

SPECIFICATION forming part of Letters Patent No. 744,785, dated November 24, 1903.

Application filed August 5, 1903. Serial No. 168,387. (No model.)

*To all whom it may concern:*

Be it known that I, BERNARD MCCAUGHEY, a citizen of the United States of America, and a resident of Pawtucket, in the county of Providence, in the State of Rhode Island, have invented certain new and useful Improvements in Drip-Pans, of which the following is a specification.

The objects of my invention are to provide a pan for roasting meat in the oven, in which a perfect circulation of hot air is secured, thus browning all sides of the meat, and also to provide a pan having an inclined bottom by means of which all the juices of the meat collect in a body in one part of the pan, preventing loss of the juices by burning.

To these ends the invention consists in certain novel details of construction and combinations and arrangement of parts, to be hereinafter described, and pointed out particularly in the claim at the end of this specification.

Figure 1:
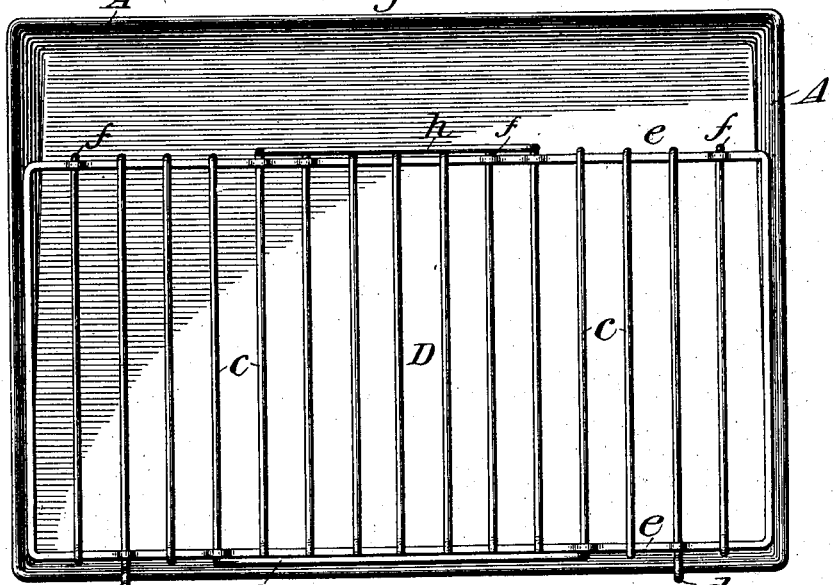
Figure 2:
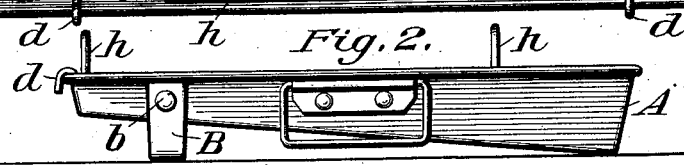
Figure 3:
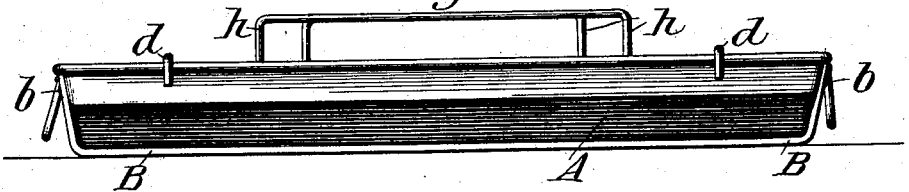
Figure 4:
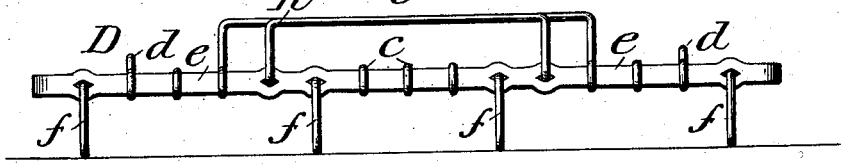

In the accompanying drawings, Figure 1 is a top plan view of a pan constructed in accordance with my invention. Fig. 2 is a side elevation. Fig. 3 is a front elevation; Fig. 4, a rear elevation of the rack.

Similar letters refer to similar parts throughout.

The pan A is preferably of the ordinary rectangular shape, formed of sheet-iron, with its walls at the forward end deeper than at the rear end, which is elevated to give the proper inclination to the flat bottom of the pan to cause the juices escaping from the meat to flow down and collect at the deeper end. The means of elevation is one of the features of my invention, and consists of a flat iron shoe B, preferably secured at either end by rivets $b$ to the side of the pan near its rear end and extending unbroken beneath the entire length of the pan. This flat shoe enables the placing of the pan upon any part of the open shelves in the ovens of cooking-stoves.

Over the inclined flat bottom of the pan and resting upon the top edge of the rear of the pan by means of lugs $d$ I locate the rack D. This rack consists of a series of parallel bars $c$, secured in preferably a rectangular wire frame $e$, and is provided at its rear side with lugs $d$ and at its front side with legs $f$ of sufficient length to rest upon the bottom of the pan and retain the top of the rack on a horizontal plane. The wire frame $h$ is made to extend vertically from each side of the pan and is secured to said front and rear sides, its object being to provide handles for raising readily the rack from the pan and also to prevent the meat from slipping from the rack.

By constructing the pan and rack as shown and described it will readily be seen that the hot air can circulate freely on all sides of the meat, as in no part do the walls of the pan rise above the top of the rack, thus thoroughly cooking the same all around, and that the escaping juices must collect in the front end of the pan in a body.

I am aware that Letters Patent dated September 24, 1889, and numbered 401,670 were issued to me for improvements in pans; but my present invention provides a much simpler and more perfect means of accomplishing the same result.

What I claim as new, and desire to secure by Letters Patent, is—

The combination with a rectangular pan having an inclined bottom and provided with a shoe secured to the same and extending unbroken beneath the length of the pan, of a removable rectangular broiler formed of a series of transversely-disposed bars and a rectangular frame and retaining devices for holding the broiler at front end of pan and legs for retaining top of broiler on a horizontal plane, all substantially as set forth.

Signed at Pawtucket this 29th day of June, 1903.

BERNARD McCAUGHEY.

Witnesses:
 EDWARD W. BLODGETT,
 FLORENCE E. BATES.